Patented Apr. 23, 1946

2,398,926

UNITED STATES PATENT OFFICE 2,398,926

CATALYTIC POLYMERIZATION OF MONO-OLEFINIC ORGANIC COMPOUNDS

George L. Dorough, Niagara Falls, N. Y., assignor to E. I. du Pont de Nemours & Company, Wilmington, Del., a corporation of Delaware No Drawing. Application March 10, 1943,
Serial No. 478,722

7 Claims. (Cl. 260—94)

This invention relates to improvements in the catalytic polymerization of organic compounds.

This invention has as an object a new and improved method for polymerizing organic compounds containing monoolefinic unsaturation. Another object is to provide a new process for polymerizing monoolefins alone and with other organic compounds containing monoolefinic unsaturation. Still another object is to provide a new process for polymerizing ethylene alone and in admixture with other polymerizable organic compounds containing monoolefinic unsaturation. Further objects reside in the provision of a class of catalysts for the polymerization of ethylene alone and in admixture with other organic compounds containing monoolefinic unsaturation to products having the valuable industrial properties hereinafter described. Other objects will appear as the description proceeds.

The above objects are accomplished by conducting the polymerization at elevated temperature in contact with an amine oxide catalyst.

The term "an amine oxide" as used herein and in the claims refers to the amine oxides, the hydrates of amine oxides, salts of amine oxides, and hydrates of salts of amine oxides. Specific examples of such compounds are trimethylamine oxide and/or its hydrate, triethylamine oxide and/or its hydrate, dimethylaniline oxide, its hydrate, and its salts, pyridine oxide, quinoline oxide, and similar cyclic compounds, their hydrates and salts. The organic compounds containing monoolefinic unsaturation used in the practice of this invention are those compounds of this kind which are known to be polymerizable and in which the sole carbon-to-carbon unsaturation is the group >C=C<. Examples of these polymerizable monoolefinic organic compounds are ethylene, propylene, the butylenes, tetrafluoroethylene, vinyl chloride, vinyl acetate, vinyl propionate, vinyl benzoate, vinyl isobutyrate, vinyl thiolaclate, vinyl dimethyl- and trimethyl-acetates, vinyl laurate, vinyl hexenoate, and other vinyl organic esters, vinylidene chloride, vinyl ketones, e. g., methyl vinyl ketone, methyl isopropenyl ketone, etc., styrene, acrylic and methacrylic acids and their derivatives such as the esters, nitriles, amides, and anhydrides, etc., N-vinylamides, e. g., N-vinylphthalimide, N-vinylsuccinimide, etc.

In the practice of this invention as a batch operation, a suitable reaction vessel is charged either with water, or with water and an organic liquid, a buffer, if desired, and an amine oxide as the catalyst. If desired, the pH of the medium is adjusted to a predetermined value by addition of acid or alkali, the vessel is closed, placed in a heated shaker machine and connected to a source of organic compound containing monoolefinic unsaturation. Controlling and recording thermo-couples are inserted, organic compound containing monoolefinic unsaturation is added to the reaction vessel, and heating and agitation are started. Upon reaching the reaction temperature, or after a period of induction, the reaction starts and is normally followed by a pressure decrease due to utilization of the organic compound containing monoolefinic unsaturation. The pressure within the system is maintained throughout the reaction period either by addition of fresh organic compound containing monoolefinic unsaturation, or by decreasing the free space in the reaction vessel by increasing the volume of the menstruum. When the reaction is complete, as evidenced by cessation of absorption of organic compound containing monoolefinic unsaturation, the vessel is cooled, bled of excess gas, opened, and the reaction mixture discharged. The polymer is isolated from the reaction mixture by means well known to the art, as by filtering and drying. The polymers are usually in a satisfactorily pure state in this form but they may be purified by washing on a mill, by solvent extraction, by means of steam distillation, drying, etc. When the products are liquid hydrocarbons, they may be separated from any water layer and then be further purified by steam distillation, fractional distillation, treatment with decolorizing agents, etc., if desired. Where the polymerization has been carried out in the presence of solvents, these may be separated by such means as fractional distillation, solvent extraction, etc.

A modification of the above process includes polymerizing ethylene with another polymerizable organic compound containing monoolefinic unsaturation, e. g., propylene or isobutylene. The organic compound to be polymerized with the ethylene can be added with the catalyst, or, if it is a gas at normal temperature and pressure, it may be expanded from pressure storage tanks into the closed reaction vessel prior to or after pressuring with ethylene or it may be added in admixture with the ethylene.

The proportion of organic compound or compound containing monoolefinic unsaturation charged into the reaction vessel can be varied over a wide range. Control of this variable can be had either by varying the pressure in the reaction vessel, by varying the ratio of the liquid charge to the free space in the reactor, by varying the reaction temperature, or by combinations of these.

As a rule the amount of catalyst will range from about 0.001% to about 5% of the total weight of monomers charged into the reaction vessel. It is preferred, however, to use as small an amount of catalyst as possible as this has an effect on the molecular weight of the product obtained. As a rule the catalyst concentration will range from about 0.1% to about 2% on the total monomer charged into the reactor.

The practice of this invention is illustrated by the following examples, in which the parts are by weight, unless otherwise specified.

Example I

A stainless steel high pressure reaction vessel lined with silver is swept with oxygen-free nitrogen and is charged with 100 parts of oxygen-free water and 0.2 part of trimethylamine oxide hydrate, care being taken to exclude atmospheric oxygen during the loading operation. The pH of the aqueous charge is adjusted from 7.43 to 2.28 by the addition of small amounts of dilute hydrochloric acid, and the reactor is closed. The charge occupies approximately one-fourth of the volume of the reaction vessel. After removal of the nitrogen by evaporation the reactor is charged with ethylene to a pressure of 200 atmospheres. The temperature of the reactor is then raised to approximately 175° C. and the pressure is adjusted to approximately 970 atmospheres. During a reaction period of 8.5 hours, the temperature is held at 157° to 175° C. and the pressure at 825 to 970 atmospheres while the contents of the reactor are constantly mixed by agitation. The total pressure drop of 2130 atmospheres is observed during the polymerization. This total pressure drop is estimated from a number of small decreases in pressure which take place as the polymerization proceeds. In all cases these pressure drops are compensated for by repressuring with ethylene to 900 to 1000 atmospheres. When the polymerization is complete, the reactor is cooled to room temperature and the excess gas is bled off. On opening the reactor, it is found to contain a large amount of solid ethylene polymer. The reaction vessel is discharged and the product separated from the aqueous phase. The dried product consists of 113 parts of a solid ethylene polymer having a relative viscosity of 1.07 (0.125% solution in xylene at 85° C.) and softening at 110° to 112° C. This ethylene polymer is useful for the production of clear, tough films and wrapping foils.

Example II

A stainless steel lined high pressure reaction vessel is swept with oxygen-free nitrogen and charged with 100 parts of oxygen-free water and 0.1 part of trimethylamine oxide hydrate, care being taken to exclude atmospheric oxygen during the loading operation. The pH of the aqueous charge is adjusted from 7.43 to 2.00 by the addition of a small amount of dilute hydrochloric acid, and the reactor closed. After removal of nitrogen by evacuation, the reactor is charged with ethylene to a pressure of 300 atmospheres. The temperature of the reactor is then raised to approximately 150° C. and the pressure adjusted to approximately 995 atmospheres. During a reaction period of 17 hours the temperature is held at 145° to 151° C. and the pressure at 705 to 995 atmospheres, while the contents of the reactor are constantly mixed by agitation. A total pressure drop of 1835 atmospheres is observed during the polymerization period. This total pressure drop is estimated from a number of small decreases in pressure taking place as the polymerization proceeds. In all cases, these pressure drops are compensated by repressuring with ethylene to 900 to 1000 atmospheres. When the polymerization is complete, the reactor is cooled to room temperature and the excess gases are bled off. On opening the reactor, it is found to contain a large amount of solid ethylene polymer. The product is removed from the reactor and separated from the aqueous phase. The product, after drying, consists of 116 parts of a high molecular weight ethylene polymer. The tensile strength of films prepared from this polymer is in excess of 1000 pounds per square inch.

Example III

A silver lined high pressure reactor is charged with 300 parts of water, 0.28 part of dimethylamine oxide dihydrate, and 0.1 part of glacial acetic acid. The reactor is evacuated and charged with 70 parts of tetrafluoroethylene. The reactor is then agitated and heated at 60° C. for 10 hours. At the end of this time the reactor is cooled, opened, and the contents discharged. There is obtained 52 parts of a white, granular tetrafluoroethylene polymer.

Example IV

Sixty parts of acrylonitrile, 111 parts of water, 7.8 parts of hexadecenyl sodium sulfate, and 0.6 part of trimethylamine oxide are placed in a reaction vessel and the mixture agitated and heated at 45° C. for 18 hours under an atmosphere of nitrogen. At the end of this time the reaction vessel is discharged and the polyacrylonitrile recovered from the reaction mixture.

Example V

A stainless steel lined high pressure reaction vessel is swept with oxygen-free nitrogen and is charged with 100 parts of oxygen-free water and 0.4 part of triethylamine oxide hydrate, care being taken to exclude atmospheric oxygen during the loading operation. The pH of the aqueous charge is adjusted from 6.4 to 1.83 by the addition of a small amount of dilute hydrochloric acid and the reactor is closed. After removal of the nitrogen by evacuation, the reactor is charged with ethylene to a pressure of 200 atmospheres. The temperature of the reactor is then raised to approximately 200° C. and the pressure is adjusted to approximately 985 atmospheres. During a reaction period of 8.75 hours the temperature is held at 198° to 201° C. and the pressure at 840 to 985 atmospheres, while the contents of the reactor are constantly mixed by agitation. A total pressure drop of 1150 atmospheres is observed during the polymerization period. This total pressure drop is estimated from a number of small decreases in pressure which take place as polymerization proceeds. In all cases these pressure drops are compensated by repressuring with ethylene to 900 to 1000 atmospheres. When polymerization is complete, the reactor is cooled to room temperature and excess gas bled off. On opening the reactor it is found to contain a large amount of solid ethylene polymer. The product is removed from the reactor and separated from the aqueous phase. After drying, the product consists of 89.7 parts of solid ethylene polymer.

Example VI

Sixty parts of methyl methacrylate, 111 parts of water, 7.8 parts of hexadecenyl sodium sulfate, and 0.6 part of trimethylamine oxide are placed in a reaction vessel and the mixture agitated and heated for 22 hours at 45° C. under a blanket of nitrogen. At the end of this time the reaction vessel is discharged and the polymethyl methacrylate recovered.

Example VII

Ethylene is subjected to high pressure polymerization in the presence of 100 parts of oxygen-free water and 0.2 part of trimethylamine oxide hydrate according to the method of Example I. In this example, however, the polymerization is run at a pH above 7, instead of in an acidic system, i. e., the pH of the original polymerization charge is adjusted from 6.9 to 13 by the addition of a small amount of dilute potassium hydroxide. During a reaction period of 7.8 hours, a pressure drop of 1920 atmospheres is observed. The product comprises 143.6 parts of high molecular weight ethylene polymer.

Example VIII

A stainless steel silver lined high pressure reaction vessel is charged with 100 parts of oxygen-free water, 0.4 part of trimethylamine oxide hydrate, 5 parts of white mineral oil, and 0.5 part of borax, care being taken to exclude atmospheric oxygen during the loading operation. The pH of the aqueous charge is 9.25. The reactor is charged with ethylene to a pressure of 225 atmospheres, the temperature raised to approximately 175° C., and the pressure to approximately 990 atmospheres. During a reaction period of 13.5 hours, the temperature is held at 174° to 181° C. and the pressure at 650 to 990 atmospheres, while the contents of the reactor are constantly mixed by agitation. A total pressure drop of 2530 atmospheres is observed during the polymerization period. This total pressure drop is estimated from a number of small decreases in pressure which occur as polymerization proceeds. In all cases, these pressure drops are compensated by repressuring with ethylene to 900 to 1000 atmospheres. When the polymerization is complete, the reactor is cooled to room temperature and the excess gas bled off. On opening the reactor, it is found to contain a large amount of solid ethylene polymer. This product is removed and separated from the aqueous phase. After drying the product is found to consist of 155.6 parts of ethylene polymer.

Example IX

Twenty-five parts of styrene and 0.02 part of trimethylamine oxide are placed in a reaction vessel and heated first at 125° C. for 3 hours, then at 150° C. for 3 hours. and the temperature then raised up to 190° C. for 1¼ hours. The resulting polymer is tough, clear, and non-crazing.

Example X

A stainless steel silver lined high pressure vessel is swept with oxygen-free nitrogen and is charged with 100 parts of oxygen-free water and 0.5 part of pyridine oxide, care being taken to exclude atmospheric oxygen during the loading operation. The pH of the aqueous charge is 5.7. After removal of the nitrogen by evacuation, the reactor is charged with ethylene to a pressure of 175 atmospheres. The temperature of the reactor is then raised to approximately 250° C. and the pressure to approximately 950 atmospheres. During a reaction period of 15.5 hours, the temperature is held at 248° to 251° C. and the pressure at 853 to 950 atmospheres, while the contents of the reactor are constantly mixed by agitation. A total pressure drop of 335 atmospheres is observed during the polymerization period. This total pressure drop is estimated from a number of small decreases in pressure which take place as the polymerization proceeds. In all cases, these decreases in pressure are compensated by repressuring with ethylene to 900 to 1000 atmospheres. When the polymerization is complete, the reactor is cooled to room temperature and the excess gas bled off. The reactor is opened and the contents discharged. From the reaction mixture there are isolated 28.6 parts of an ethylene polymer.

The amine oxide catalysts of this invention are operable in the bulk, solution, and emulsion polymerizations of any polymerizable organic compound of the hereinbefore mentioned type. The preferred reaction medium is water because the polymerization is, in general, highly exothermic and it is therefore necessary to remove the heat of reaction rapidly, if the reaction is to be kept under control. Because of its high heat capacity and high conductivity water is an ideal medium for dissipating the heat of reaction and through its use the necessity for having to provide special means for heat dissipation are avoided. This makes it possible to exercise closer control on the reaction. This ability to control the reaction leads to the production of polymers having a high degree of homogeneity. The use of water is particularly advantageous when the reaction is carried out on a large scale, since the possibility of local overheating with resultant danger of rupturing the reaction vessel is essentially eliminated. The ratio of water to polymerizable organic compounds can be varied over wide limits.

If desired, the water can be replaced in part by an organic solvent such as an aromatic hydrocarbon which like water is substantially inert, i. e., it does not participate in the reaction. In some instances it may be desirable to replace the water in part with an organic solvent of an active type, e. g., one which not only functions as a diluent but also as a reactant. Examples of such materials are ethanol, ketones, acetals, ethers, esters, acids, halogenated aliphatic hydrocarbons, e. g., carbon tetrachloride, chloroform, etc.

It is often advantageous to avoid radical changes in pH during the course of the polymerization. In order to avoid such changes it is advisable, although not essential, to include in the polymerization mixture a small amount of a material which has a buffering action. Since the polymerization can be carried out satisfactorily in either an acid or an alkaline medium, many types of buffering agents can be used. For example, an alkaline pH can be maintained by the use of such buffers as borax, disodium phosphate, sodium carbonate, ammonium carbonate, and sodium acetate. For a pH below 7, such media as acetic acid, propionic acid, and other organic acids, monosodium phosphate, monosodium acid phthalate, etc., can be used. In some instances it is desirable to have a low pH, e. g., 2 at the outset or during the reaction, in which case a strong acid such as hydrochloric or sulfuric may be added to the reaction charge in small amounts.

It is preferable to use reagents as pure as is commercially feasible. In general the process is operated under conditions such that the molecular oxygen content of the system, based on the total monomer charge, e. g., ethylene, or ethylene and other polymerizable organic compounds containing monoolefinic unsaturation is less than 1000 parts per million of oxygen and 200 parts per million being preferred, and under 20 parts per million giving attractive products.

The catalysts are also suitable for polymerizing ethylene in the presence of hydrogen and especially in the presence of from 0.1 to 10.0% by weight of hydrogen based on the ethylene used, the conditions for effecting the polymerization being similar to those used for the polymerization of ethylene.

The present invention provides water-soluble catalysts for the polymerization of monoolefins which can be used in such small quantities as offer no serious separation or purification problems. They are effective over a wide range of temperature and pressure, are not easily poisoned, and are effective in the presence of a variety of materials. High molecular weight hydrocarbon products can be obtained by this invention without the necessity of employing expensive refrigerating equipment.

The amine oxide catalysts used in the present polymerization process are operable at temperatures which may be as low as 20° C. and up to 400° C. but it is generally preferred to operate at temperatures in the range of 150° to 350° C. and at pressures in excess of atmospheric. In general pressures in excess of 4 atmospheres are used and usually in the range of 200 to 3000 atmospheres. As a rule the use of higher pressures permits the use of lower temperatures. The particular conditions of temperature and pressure in any one case are determnied not only by the particular amine oxide catalyst used but also by the material being polymerized. Temperature and pressure are interdependent variables and the conditions for optimum results in any one instance have to be determined experimentally.

The present amine oxide catalysts do not have long induction periods, are rapid and enduring in their activity, and the limits of their effectiveness is reached only when the free space in the reactor is completely occupied with product so that no more monomer or monomers can be introduced. In view of this fact, it is usually advantageous to employ these catalysts in a continuous polymerization system from which the products are removed continuously. Such a continuous process may be exemplified by the passage of the whole polymerization mixture through a reaction zone maintained under appropriate polymerization conditions or by pumping the reactants separately through a mixing chamber, then through a reaction zone, or by pumping the reactants separately through a mixing zone, then introducing a catalyst solution or suspension immediately prior to entering the reaction zone. In a continuous process, the catalyst solution or suspension can be introduced at intermediate stages throughout the reaction zone, since by this means the heat developed in any portion of the apparatus is relatively small and consequently the polymerization can be carried through to a desirably high molecular weight product. The present process is exothermic in character, and, as in any process where the amount of heat to be removed is large, a continuous process permits greater precision in control and consequently more uniformly excellent results.

The amine oxide catalysts of this invention can be used for the production of high molecular weight hydrocarbons at temperatures much higher than those at which catalysts of the Friedel and Crafts type, etc., are effective. The catalysts are operable in the absence of agitation, but in many instances good agitation is conducive to improved yields of polymers.

The amine oxide catalysts of this invention are useful for the production of polymeric solid and liquid hydrocarbons from simple monoolefinic hydrocarbons. Such products are valuable for use as lubricants and greases, extruded or molded shapes, wrapping foils, films, electrical and thermal insulating materials (liquid and solid), filaments, and for many other purposes well known to the art in which high molecular weight polymers are employed.

This invention also provides a single step process for producing high quality lubricating oils which do not require further alteration or chemical treatment other than separation, filtering or drying.

The term "polymer" is used herein in a generic sense to refer to the products obtained by polymerizing one or more organic compounds containing monoolefinic unsaturation.

As many apparently widely different embodiments of this invention may be made without departing from the spirit and scope thereof, it is to be understood that the invention is not limited to the specific embodiments thereof except as defined in the appended claims.

I claim:

1. A process for obtaining polymers which comprises polymerizing an organic compound containing as the sole carbon to carbon unsaturation one and only one double bond by heating said compound at a temperature of about 150° to 400° C. under a pressure of at least 200 atmospheres in contact with an amine oxide catalyst.

2. The process set forth in claim 1 in which the amine oxide catalyst is trimethylamine oxide hydrate.

3. The process set forth in claim 1 in which the amine oxide catalyst is triethylamine oxide hydrate.

4. The process set forth in claim 1 in which the amine oxide catalyst is dimethylaniline oxide.

5. The process set forth in claim 1 in which the said organic compound containing monoolefinic unsaturation is ethylene.

6. In a process for obtaining polymers, the step which comprises heating a monoolefin hydrocarbon and at least one other organic compound containing monoolefinic unsaturation at a temperature of from 150° C. to 400° C. and under a pressure in excess of 200 atmospheres in the presence of from 0.1% to 2% by weight of an amine oxide catalyst.

7. In a process for obtaining polymers the step which comprises polymerizing ethylene at a temperature of from 150° C. to 400° C. and under a pressure in excess of 200 atmospheres in the presence of from 0.1% to 2% by weight of an amine oxide catalyst.

GEORGE L. DOROUGH.

Certificate of Correction

Patent No. 2,398,926.  April 23, 1946.

GEORGE L. DOROUGH

It is hereby certified that error appears in the printed specification of the above numbered patent requiring correction as follows: Page 1, first column, line 42, for "thiolaclate" read *thiolacetate*; and that the said Letters Patent should be read with this correction therein that the same may conform to the record of the case in the Patent Office.

Signed and sealed this 18th day of June, A. D. 1946.

[SEAL]

LESLIE FRAZER,
*First Assistant Commissioner of Patents.*